United States Patent
Lau et al.

(10) Patent No.: US 12,387,636 B2
(45) Date of Patent: Aug. 12, 2025

(54) OPTICAL CALIBRATION

(71) Applicant: Apple Inc., Cupertino, CA (US)

(72) Inventors: Brian S. Lau, Sacramento, CA (US); Michael J. Oudenhoven, San Francisco, CA (US); Chih Jen Chen, San Jose, CA (US); Dominic P. Cincione, San Francisco, CA (US); Christopher Patton, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/710,581

(22) PCT Filed: Nov. 30, 2022

(86) PCT No.: PCT/US2022/051448
§ 371 (c)(1),
(2) Date: May 15, 2024

(87) PCT Pub. No.: WO2023/102076
PCT Pub. Date: Jun. 8, 2023

(65) Prior Publication Data
US 2025/0029523 A1    Jan. 23, 2025

Related U.S. Application Data

(60) Provisional application No. 63/285,440, filed on Dec. 2, 2021.

(51) Int. Cl.
*G09G 3/00* (2006.01)
*G06T 7/70* (2017.01)

(52) U.S. Cl.
CPC ............... *G09G 3/001* (2013.01); *G06T 7/70* (2017.01); *G09G 2320/0693* (2013.01);
(Continued)

(58) Field of Classification Search
CPC ...... G02B 2027/0138; G02B 2027/014; G02B 27/0172; G02B 27/0179; G06T 7/70;
(Continued)

(56) References Cited

U.S. PATENT DOCUMENTS 11,269,406 B1 * 3/2022 Sztuk ................. G02B 27/0093
11,575,872 B2 * 2/2023 Ardisana, II ......... H04N 13/344
(Continued)

OTHER PUBLICATIONS

International Search Report and Written Opinion from PCT/US2022/051448, dated Apr. 11, 2023, 11 pages.

*Primary Examiner* — Dmitriy Bolotin
(74) *Attorney, Agent, or Firm* — BAKERHOSTETLER

(57) ABSTRACT

A wearable electronic device can include displays and/or cameras that can be calibrated for accurate recording and visual output. Whereas some aspects of a wearable electronic device can be calibrated at the time of production, usage and wear of the wearable electronic device can result in certain components becoming misaligned. A calibration device can provide an output that serves as a reference for each of a pair of displays of the wearable electronic device. Each of the displays can be independently adjusted so their corresponding outputs are properly aligned with the view of the external environment.

20 Claims, 7 Drawing Sheets

(52) U.S. Cl.
CPC ............... *G09G 2340/0464* (2013.01); *G09G 2340/0492* (2013.01); *G09G 2354/00* (2013.01)

(58) Field of Classification Search
CPC ... G09G 2320/0693; G09G 2340/0464; G09G 2340/0492; G09G 2354/00; G09G 3/001
See application file for complete search history.

(56) References Cited

U.S. PATENT DOCUMENTS

| | | | |
|---|---|---|---|
| 11,575,874 B2* | 2/2023 | Ryuma | G02B 27/017 |
| 11,586,048 B2* | 2/2023 | Osterhout | G06F 1/1658 |
| 12,073,015 B1* | 8/2024 | Sztuk | G06V 40/19 |
| 2006/0028400 A1* | 2/2006 | Lapstun | G02B 27/0093 |
| | | | 345/8 |
| 2013/0120224 A1 | 5/2013 | Cajigas et al. | |
| 2013/0187943 A1* | 7/2013 | Bohn | G02B 27/64 |
| | | | 345/619 |
| 2015/0331485 A1* | 11/2015 | Wilairat | G02B 27/0093 |
| | | | 345/156 |
| 2016/0216792 A1* | 7/2016 | Ogawa | G02B 27/0172 |
| 2017/0045736 A1* | 2/2017 | Fu | G02B 27/017 |
| 2017/0289535 A1 | 10/2017 | Crispin et al. | |
| 2024/0171726 A1* | 5/2024 | Hernandez | H04N 13/366 |
| 2024/0427157 A1* | 12/2024 | Connor | G02B 26/0816 |
| 2025/0130634 A1* | 4/2025 | Sztuk | G02B 27/0093 |

\* cited by examiner

OPTICAL CALIBRATION

CROSS-REFERENCE TO RELATED APPLICATION

This application claims the benefit of U.S. Provisional Application No. 63/285,440, entitled "OPTICAL CALIBRATION FOR HEAD-MOUNTABLE DEVICES," filed Dec. 2, 2021, the entirety of which is incorporated herein by reference.

TECHNICAL FIELD

The present description relates generally to head-mountable devices, and, more particularly, to optical calibration for head-mountable devices, such as eyeglasses.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include audio output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
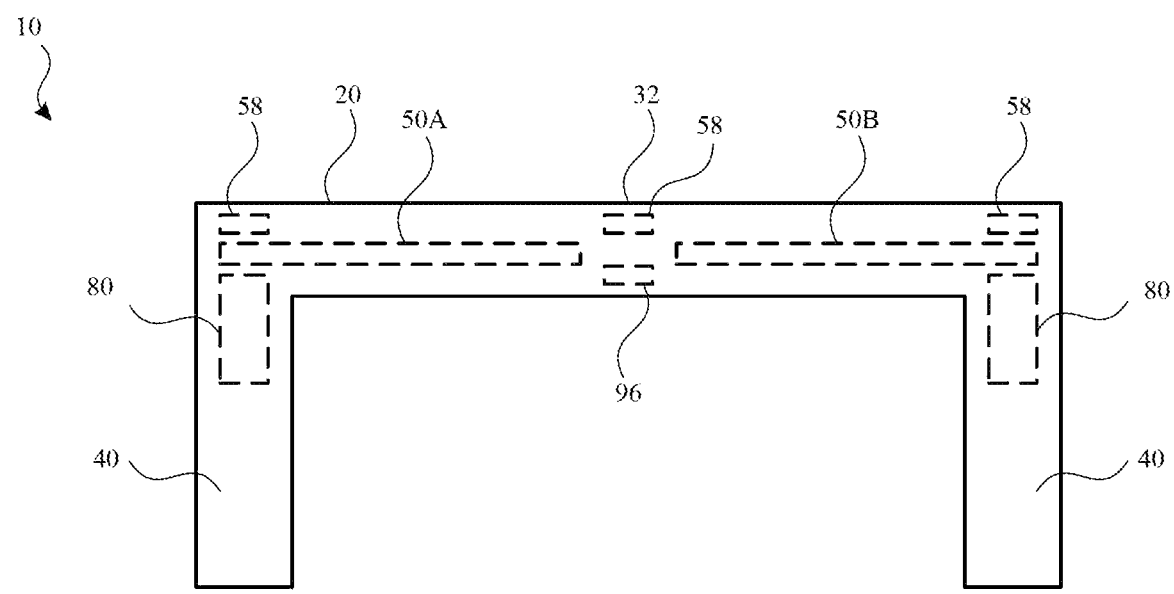
FIG. 1 illustrates a top view of a head-mountable device, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mounted devices, such as head-mounted displays, headsets, visors, smartglasses, head-up display, etc., can perform a range of functions that are managed by the components (e.g., sensors, circuitry, and other hardware) included with the wearable device. Interactive systems including head-mounted devices can include multiple parts, such as a head-mounted device that supports an electronic device. The head-mounted device and/or the electronic device can provide the user with outputs such as audio and visual information. The head-mounted device and/or the electronic device can also receive inputs from a user.

Components of a head-mountable device can include one or more cameras that capture images and/or displays that provide views (e.g., to an external environment). Such displays can include a projector and/or a waveguide that enhance a user's view of the external environment. The displays can be oriented in a direction that optimally provides a view along an optical pathway between the display and the eye of the user. For example, the displays can emit light along the optical pathway to arrive at the user's eye, along with light from the external environment.

During use and across the lifespan of the head-mountable device, the optical components, including the cameras and/or displays, can become misaligned. For example, the support structure supporting a camera and/or a display can be altered due to shock (e.g., drop event, impact, etc.), degradation, erosion, friction, wear, and/or aging of components. High-resolution cameras and displays in head-mountable devices are sensitive to misalignment. Angular or positional shifts can cause user discomfort due to monocular focus gradients, binocular focus differences, degradation in image sharpness, and reductions or shifts in the field of view (FOV). While the head-mountable device can be aligned during assembly, it can be beneficial to maintain and/or correct the alignment of a camera and/or a display with respect to the eyes of the user. Additionally, certain components can be provided after manufacture, such as lenses that are selected to accommodate a particular user. Initial and ongoing calibration for such lenses can be performed on an ongoing basis.

Systems, devices, and methods of the present disclosure can provide a head-mountable device that interacts with a calibration device to determine whether adjustments to the display outputs is recommended. Whereas some aspects of a head-mountable device can be calibrated at the time of production, usage and wear of the head-mountable device can result in certain components becoming misaligned. The calibration device can provide an output that serves as a reference for each of a pair of displays of the head-mountable device. Each of the displays can be independently adjusted so their corresponding outputs are properly aligned with the view of the external environment.

These and other embodiments are discussed below with reference to FIGS. 1-16. However, those skilled in the art will readily appreciate that the detailed description given herein with respect to these Figures is for explanatory purposes only and should not be construed as limiting.

According to some embodiments, for example as shown in FIG. 1, a head-mountable device 10 includes a frame 20 that is worn on a head with one or more arms 40. The frame 20 can be positioned in front of the eyes of a user to provide information within a field of view of the user. The frame 20 can provide nose pads or another feature to rest on a user's nose. The frame 20 further includes one or more displays 50A and 50B and a bridge 32 above nose pads and connecting multiple optical modules 50.

The frame 20 and/or the arms 40 can serve to surround a peripheral region of the head-mountable device 10 as well as support any internal components in their assembled position. For example, the frame 20 and/or the arms 40 can enclose and support various internal components (including for example integrated circuit chips, processors, sensors, input/output devices, memory devices, and other circuitry) to provide computing and functional operations for the head-mountable device 10, as discussed further herein.

Displays 50A and 50B can transmit light from a physical environment for viewing by the user. Such displays 50A and 50B can include optical properties, such lenses for vision correction based on incoming light from the physical environment. Additionally or alternatively, displays 50A and 50B can provide information as a display within a field of view of the user. Such information can be displayed based on operation of a projector 80 that projects light onto and/or communicates with one or more elements of the displays 50A and 50B, such as waveguides. As shown in FIG. 1, the displays 50A and 50B can reside, at least partially, in one or more of the arms 40 and/or in the frame 20. For example, the projectors 80 can reside, at least partially, within a cavity extending from the frame 20 and into the arm 40. Displayed information can be provided to the exclusion of a view of a physical environment or in addition to (e.g., overlaid with) a physical environment.

A physical environment refers to a physical world that people can interact with and/or sense without necessarily requiring the aid of an electronic device. A computer-generated reality environment relates to a partially or wholly simulated environment that people sense and/or interact with the assistance of an electronic device. Examples of computer-generated reality include, but are not limited to, mixed reality and virtual reality. Examples of mixed realities can include augmented reality and augmented virtuality. Examples of electronic devices that enable a person to sense and/or interact with various computer-generated reality environments include head-mountable devices, projection-based devices, heads-up displays (HUDs), vehicle windshields having integrated display capability, windows having integrated display capability, displays formed as lenses designed to be placed on a person's eyes (e.g., similar to contact lenses), headphones/earphones, speaker arrays, input devices (e.g., wearable or handheld controllers with or without haptic feedback), smartphones, tablets, and desktop/laptop computers. A head-mountable device can have an integrated opaque display, have a transparent or translucent display, or be configured to accept an external opaque display from another device (e.g., smartphone).

Referring again to FIG. 1, a frame 20 can be supported on a user's head with the arms 40. The arms 40 can wrap or extend along opposing sides of a user's head. The arms 40 or portions thereof can further wrap around or otherwise engaging a user's ears. It will be appreciated that other configurations can be applied for securing the head-mountable device 10 to a user's head. For example, one or more bands, straps, belts, caps, hats, or other components can be used in addition to or in place of the illustrated components of the head-mountable device 10. By further example, an arm can extend about a user's head to both sides of the frame 20.

The frame 20 can be coupled to or integral (e.g., monolithic) with one or more of the arms 40. For example, a continuous support structure including the frame 20 can support the displays 50A and 50B as well as the projectors 80. While at least a portion of the arms 40 can optionally move with respect to the frame 20, it will be understood that, in at least some embodiments, the frame 20 and/or the arms 40 can form a continuous structure that supports both the displays 50A and 50B as well as the projectors 80 to facilitate relative alignment of the displays 50A and 50B and their corresponding projector 80. As such, the arms 40 can refer to at least a portion of the support structure that extends away from the portion of the frame 20 and that supports the displays 50A and 50B.

In some embodiments, each of the displays 50A and 50B can include a projector 80 (e.g., a light projector) and a waveguide. The projector 80 can include any and all components for projecting light in the desired manner. For example, the projector 80 can include light sources, such as an RGB module, polarizers, beam splitters, collimators, lenses, and the like. The displays 50A and 50B can include a waveguide that allows internal reflections of received light, as well as one or more other optical components, such as corrective lenses.

The head-mountable device 10 can include one or more sensors. For example, the head-mountable device 10 can include a camera or other sensor 58 for capturing a view of an environment external to the head-mountable device 10. The sensor 58 can include an optical sensor, such as a photodiode or a photodiode array, a charge-coupled device (CCD) and/or a complementary metal-oxide-semiconductor (CMOS) device, a photovoltaic cell, a photo resistive component, a laser scanner, and the like. The sensor 58 may be configured to capture an image of a scene or subject located within a field of view of the sensor 58.

By further example, the head-mountable device 10 can include a sensor 96 for detecting one or more properties of user, the head-mountable device 10, and/or an external environment. The sensor 96 can be or include one or more user sensors for tracking features of the user wearing the head-mountable device 10. For example, a user sensor can perform facial feature detection, facial movement detection, facial recognition, eye tracking, user mood detection, user emotion detection, voice detection, etc. Such eye tracking may be used to determine a location of information to be displayed by the displays 50A and 50B and/or a portion (e.g., object) of a view to be analyzed by the head-mountable device 10. By further example, the user sensor can be a bio-sensor for tracking biometric characteristics, such as health and activity metrics.

Additionally or alternatively, the sensor 96 can be or include one or more HMD sensors. Such HMD sensors can include any sensor that detects one or more conditions of the head-mountable device 10. For example, an HMD sensor can include an inertial measurement unit (IMU), a thermal sensor, a magnetometer, a gyroscope, an accelerometer, a global positioning sensor, a tilt sensor, and the like. An HMD sensor can be configured to sense substantially any type of characteristic such as, but not limited to, images, pressure, light, touch, force, temperature, position, motion, and so on. Where applicable, the detected conditions can be correlated to the user when the head-mountable device 10 is worn by the user.

Additionally or alternatively, the sensor 96 can be or include one or more environment sensors that are directed to an external environment. Such environment sensors can include any sensor that detects one or more conditions in an environment of the head-mountable device 10. For example, an environment sensor can include an imaging device, a thermal sensor, a proximity sensor, a motion sensor, a humidity sensor, a chemical sensor, a light sensor, a magnetometer, and/or a UV sensor. An environment sensor can be configured to sense substantially any type of characteristic such as, but not limited to, images, pressure, light, touch, force, temperature, position, motion, and so on.

An example of a sensor 96 is illustrated in FIG. 1 as being positioned at the bridge 32 of the frame 20 (e.g., between the displays 50A and 50B). It will be understood that the sensor 96 and/or other sensors can be positioned at other locations (e.g., the frame 20, the arms 40, etc.) to effectively detect the target property.

Figure 2:
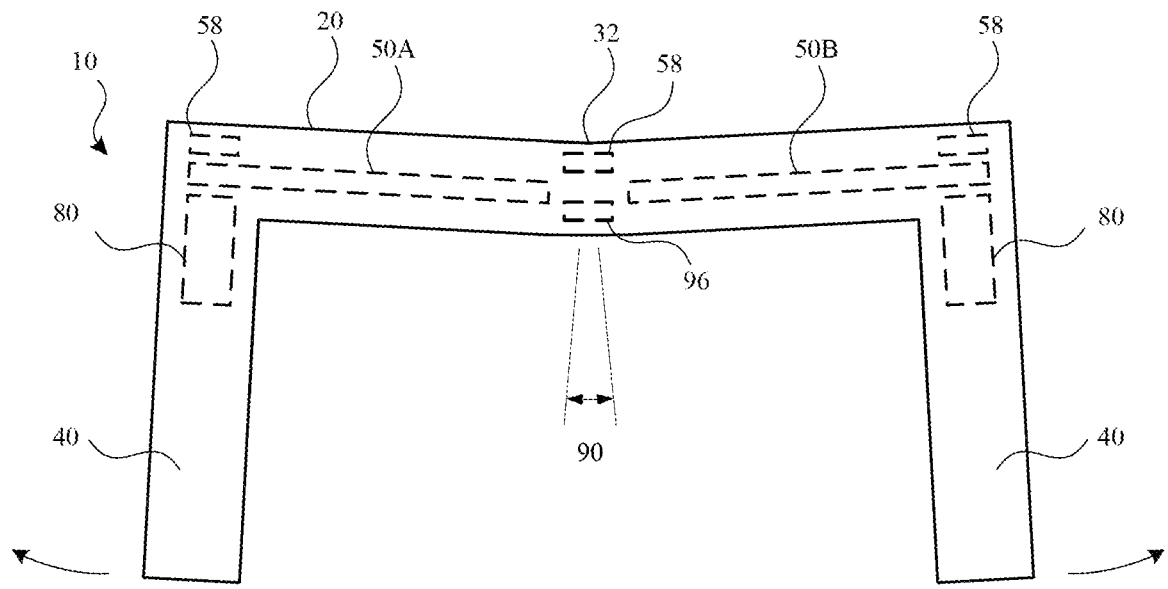
FIG. 2 illustrates a top view of the head-mountable device of FIG. 1, according to some embodiments of the present disclosure.
Figure 3:
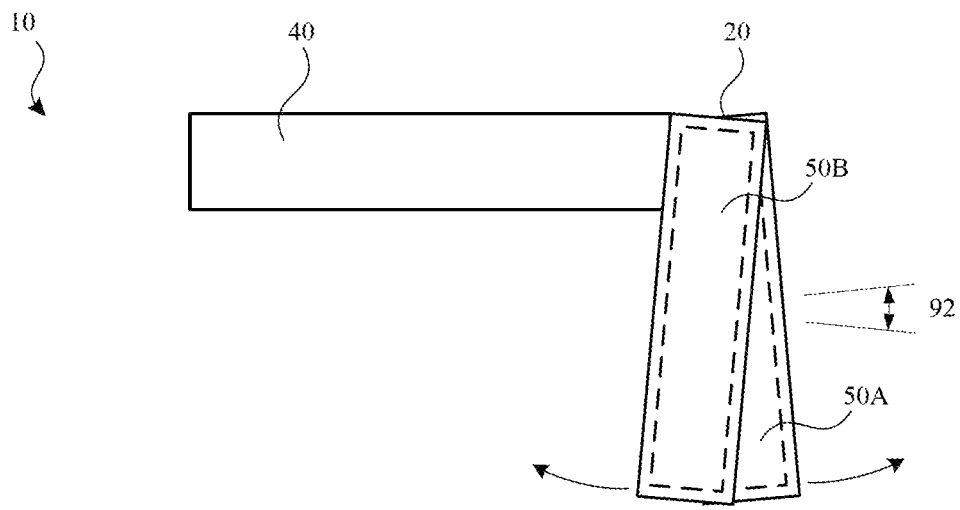
FIG. 3 illustrates a side view of the head-mountable device of FIG. 1, according to some embodiments of the present disclosure.
Figure 4:
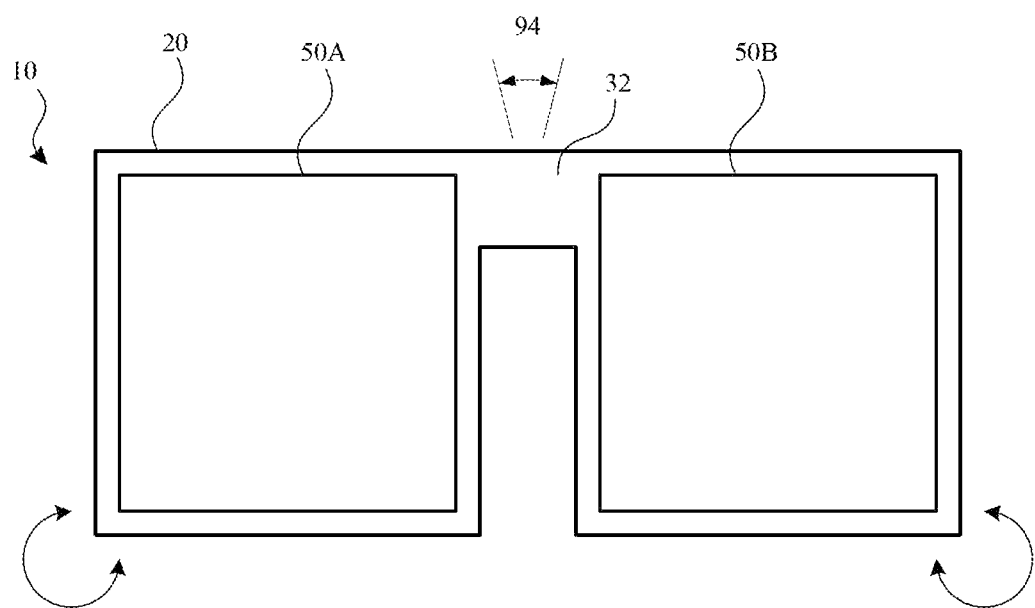
FIG. 4 illustrates a front view of the head-mountable device of FIG. 1, according to some embodiments of the present disclosure.

Referring now to FIGS. 2-4, a head-mountable device can be provided with an ability to calibrate itself to correct for changes that occur with loads (e.g., force, torque, stress) applied thereto. In particular, forces applied to different portions of a head-mountable device in different directions can cause rotational and/or positional displacement that causes the displays to be at an unexpected location and/or orientation. Such displacement can further cause displacement between a display element in the frame and a waveguide in the optical module and/or otherwise cause light projected onto the waveguide to provide an image to the user that is not properly aligned with the view of the external environment.

For example, as shown in FIG. 2, forces can be applied to the head-mountable device 10, for example when the arms 40 are separated away from each other. Such forces can occur when the head-mountable device 10 is resting against the sides of a user's head and/or when the head-mountable device 10 is placed on or removed from the head. Such forces can be transferred to the frame 20 such that the frame 20 tends to bend about a portion thereof, thereby adjusting an angle 90 between the displays 50A and 50B.

By further example, as shown in FIG. 3, a torque can be applied to the head-mountable device 10, for example at one or both of the arms 40 and about an axis that extends through one or both of the arms 40. Such a torque can occur when the head-mountable device 10 is removed from a head of the user from one side before the other. A torque applied to one or more of the arms 40 can be transferred to the frame 20 in a manner that twists the frame 20, thereby adjusting an angle 92 between the displays 50A and 50B.

By further example, as shown in FIG. 4, torque can be applied to the head-mountable device 10, for example when the sides of the frame 20 are pivoted about the bridge 32. Such torque can be transferred to the frame 20 such that the frame 20 tends to bend about a portion thereof, such as the bridge 32, thereby adjusting an angle 94 between the displays 50A and 50B.

Any one or more of the forces and/or torques described herein can distort the position and/or orientation of the displays 50A and 50B relative to each other and/or the user while the head-mountable device 10 is worn by the user. It will be understood that such distortions can occur before, during, and/or after user by the user. As such, the distortions can be incurred in different ways by different users (e.g., having different head shapes and/or sizes) and/or over time (e.g., through plastic deformation of the head-mountable device 10). It will be further understood that such distortions can alter the perceived alignment of the output of the displays 50A and 50B with respect to the external environment, which can be viewed by the user through the displays 50A and 50B. Where proper alignment is not achieved, information output by the displays 50A and 50B may not achieve the intended position and/or orientation with respect to the review provided thereby. Accordingly, it can be desirable to calibrate the outputs of the displays 50A and 50B to achieve the proper alignment.

Figure 5:
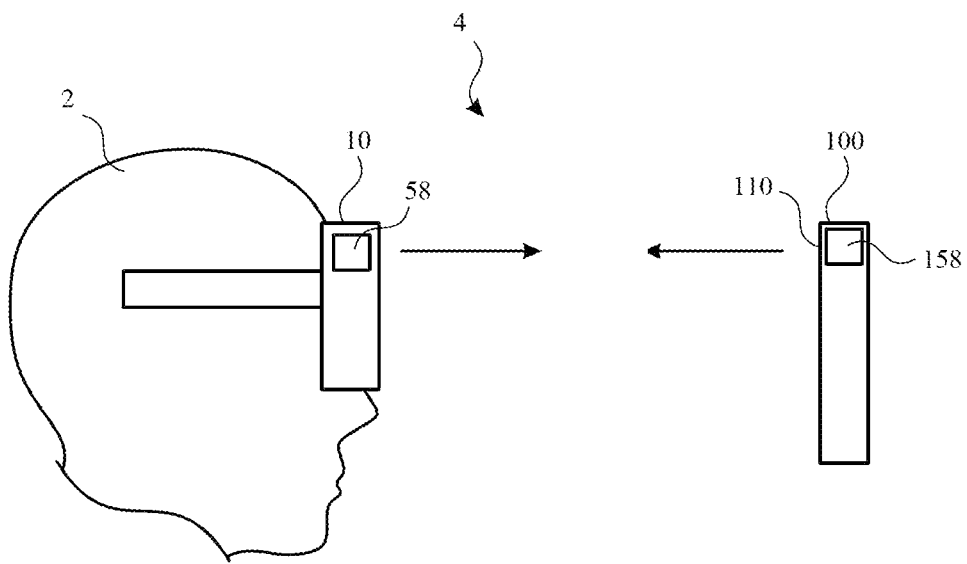
FIG. 5 illustrates a side view of a head-mountable device and a calibration device, according to some embodiments of the present disclosure.

Referring now to FIG. 5, a head-mountable device can be operated in conjunction with another device, such as a calibration device, that provides a reference and/or feedback to facilitate the determination of recommended calibration adjustments to the displays of the head-mountable device. As shown in FIG. 5, the head-mountable device 10 can be worn on a head of a user 2. A calibration device 100 can be provided within a field of view of the head-mountable device 10 and the user 2.

As shown in FIG. 5, the head-mountable device 10 can include a sensor 58 for detecting the calibration device 100. Such a detection can facilitate determination of the position and/or the orientation of the calibration device 100 with respect to the head-mountable device 10. This determination can be the basis for determining whether an output provided by a display of the head-mountable device 10 is aligned with an output of the display 110 of the calibration device 100.

A system 4 can include a head-mountable device 10 and a calibration device 100. The calibration device 100 can be, include, and/or operate in concert with any device that interacts with the head-mountable device 10. Examples of such a calibration device 100 include a portable computing device, a tablet device, a laptop computer, a smartphone, a smart watch, or other appropriate devices for interaction with the head-mountable device 10. In some embodiments, the calibration device 100 is a hand-held device that the user can hold, observe, and/or operate while wearing the head-mountable device 10.

The sensor 58 of the head-mountable device 10 can include one or more types of sensors for detecting the calibration device 100. For example, the sensor 58 can include one or more image sensors (e.g., cameras), depth sensors, thermal (e.g., infrared) sensors, and the like. By further example, a depth sensor can be configured to measure a distance (e.g., range) to an object (e.g., region of the user's head) via stereo triangulation, structured light, time-of-flight, interferometry, and the like. Additionally or alternatively, the sensor 58 and/or the device can capture and/or process an image based on one or more of hue space, brightness, color space, luminosity, and the like. The calibration device 100 can have one or more known features to be recognized by the head-mountable device 10. For example, a shape, size, color, silhouette, external marking or label, and/or other reference provided by the calibration device 100 can be detected by the sensor 58 of the head-mountable device 10.

While the head-mountable device 10 can directly and/or independently detect the calibration device 100, it will be understood that, additionally or alternatively, the calibration device 100 can detect a head-mountable device 10. For example, distortions of the types described herein applied to the head-mountable device 10 can affect operation of the sensors 58 of the head-mountable device 10. In such a condition, it can be advantageous to provide detection's from the calibration device 100 in addition to or as a replacement for the detection's performed by the sensors 58 of the head-mountable device 10.

The sensor 158 of the calibration device 100 can include one or more types of sensors for detecting the head-mountable device 10. For example, the sensor 158 can include one or more image sensors (e.g., cameras), depth sensors, thermal (e.g., infrared) sensors, and the like. By further example, a depth sensor can be configured to measure a distance (e.g., range) to an object (e.g., region of the user's head) via stereo triangulation, structured light, time-of-flight, interferometry, and the like. Additionally or alternatively, the sensor 158 and/or the device can capture and/or process an image based on one or more of hue space, brightness, color space, luminosity, and the like. The head-mountable device 10 can have one or more known features to be recognized by the calibration device 100. For example, a shape, size, color, silhouette, external marking or label, and/or other reference provided by the head-mountable device 10 can be detected by the sensor 158 of the calibration device 100.

It will be understood that the sensors of the head-mountable device 10 and/or the calibration device 100 can operate independently or in concert with each other to determine relative positions and/or orientations of the head-mountable device 10 and the calibration device 100. In some embodiments, the detections of both devices can be combined to determine average relative positions and/or orientations. In some embodiments, the detections of either device can be used to verify the detections of the other. In some embodiments, the detections of one device can be used to the exclusion of the other. The detections of either device can be communicated to the other device, for example via network interfaces of the devices, as described herein. Accordingly, the shared information can be used by either device or both devices for further processing.

Figure 6:
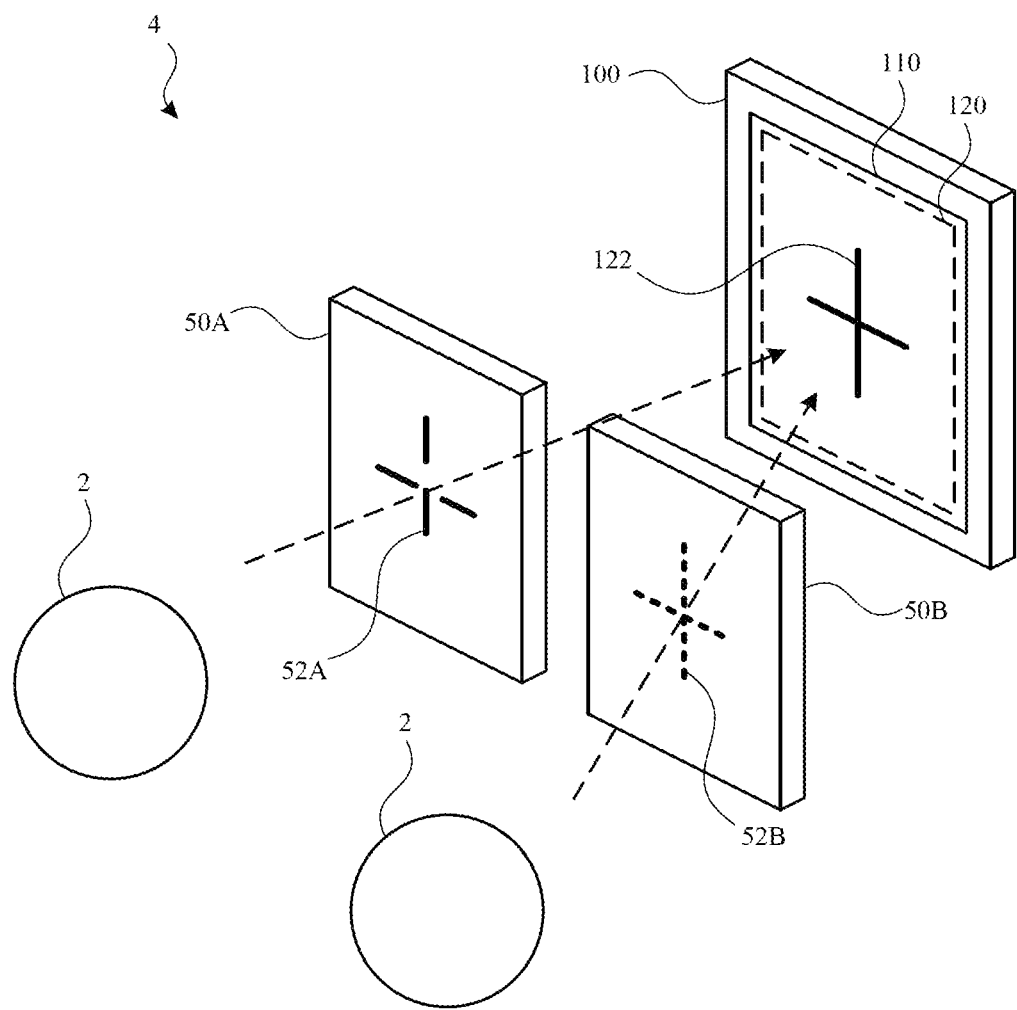
FIG. 6 illustrates a perspective view of displays of a head-mountable device and a calibration device, according to some embodiments of the present disclosure.

Referring now to FIG. 6, the displays of a calibration device and a head-mountable device can provide fiducials as visual outputs to compare the optical alignments of the displays. As shown in FIG. 6, the displays 50A and 50B are separately provided in front of each of corresponding eyes of the user 2. The displays 50A and 50B can each provide a view to the display 110 of the calibration device 100 as well as information superimposed thereon. For example, the first display 50A can visually output a first display fiducial 52A, and the second display 50B can visually output a second display fiducial 52B. Each display and its corresponding fiducial may be presented only to the corresponding eye of the user, such that both eyes need not be presented with the same fiducial.

As further shown in FIG. 6, the display 110 can provide an interface 120 that includes one or more visual elements. For example, the display 110 can visually output a calibration fiducial 122. The display 110 its calibration fiducial 122 may be viewable by both eyes and through each of the corresponding displays 50A and 50B. As such, each eye can simultaneously observe one of the display fiducials 52A and 52B and the calibration fiducial 122.

The display fiducials 52A and 52B and the calibration fiducial 122 can be similar in at least one aspect, such as shape, size, aspect ratio, and the like. Such similarities can help a user recognize when the fiducials are aligned, in that they can form a certain visual appearance when overlapping (e.g., one hidden behind the other) and a different visual appearance when not overlapping (e.g., one appearing from behind the other). The display fiducials 52A and 52B and the calibration fiducial 122 can be different in at least one aspect, such as color, brightness, shape, and the like. Such differences can help a user distinguish between different fiducials despite simultaneous observation, to facilitate a determination of which indicates a need (if any) for adjustment. While the fiducials of FIG. 6 are illustrated as reticles (e.g., cross, etc.), the fiducials can be of any shape or design, including those that facilitate recognition for relative position and/or orientation.

Referring now to FIGS. 7-10, interface provided by the head-mountable device and the calibration device can provide a user with an ability to observe, correct, and verify alignment parameters of multiple displays with respect to a reference element in an external environment. A combined interface 60 is shown in FIGS. 7-10. It will be understood that such a combined interface 60 can include visual elements provided by the displays of a head-mountable device as well as the display 110 of the calibration device 100, including the fiducials and/or other visual elements provided thereby. The combined interface 60 can further include a view to other objects in an external environment. While the displays of the head-mountable device provide separate views to each of the users to eyes, it will be understood that the combined interface 60 represents a composite view as perceived by a user. As such, the binocular vision of the user can be perceived as a single visual output that simultaneously includes fiducials from the displays of the head-mountable device and one or more fiducials from the display of the calibration device. By providing such views simultaneously in a superimposed or overlapping manner, the user can compare the relative alignments of the fiducials.

Figure 7:
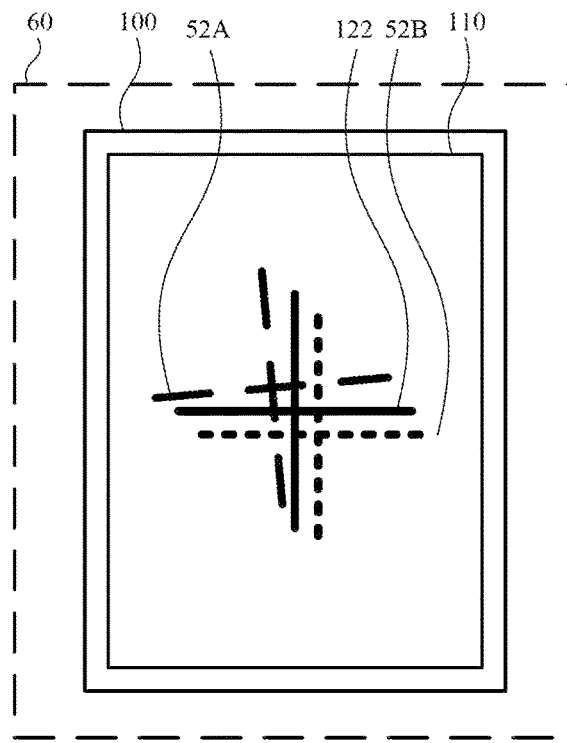
FIG. 7 illustrates an interface provided by displays of a head-mountable device for a view to a calibration device, according to some embodiments of the present disclosure.

As shown in FIG. 7, each of the display fiducials 52A and 52B can be provided with a position and orientation with respect to the calibration fiducial 122. The display fiducials 52A and 52B can be initially presented based on a detected position and/or orientation of the calibration device 100 with respect to the head-mountable device 10. For example, in a non-distorted alignment of the head-mountable device, the display fiducials 52A and 52B would be presented in a position and orientation that matches the position and orientation of the calibration fiducial 122. Depending on the presence and nature of any distortion in the head-mountable device, one or both of the display fiducials 52A and 52B can have a position and/or orientation that is different from the position and/or orientation of the calibration fiducial 122.

As the user observes the display fiducials 52A and 52B and the calibration fiducial 122, the user can provide feedback in the form of user input provided to the head-mountable device and/or the calibration device. For example, an input device of the head-mountable device can be operated by the user to adjust one or both of the display fiducials 52A and 52B until they align with the calibration fiducial 122. By further example, an input device of the calibration device 100 can be operated by the user to adjust one or both of the display fiducials 52A and 52B until they align with the calibration fiducial 122. Where the user input is received by the calibration device 100, such user input can be communicated to the head-mountable device so that the displays of the head-mountable device are operated (e.g., with adjusted display fiducials) based on the user input.

Figure 8:
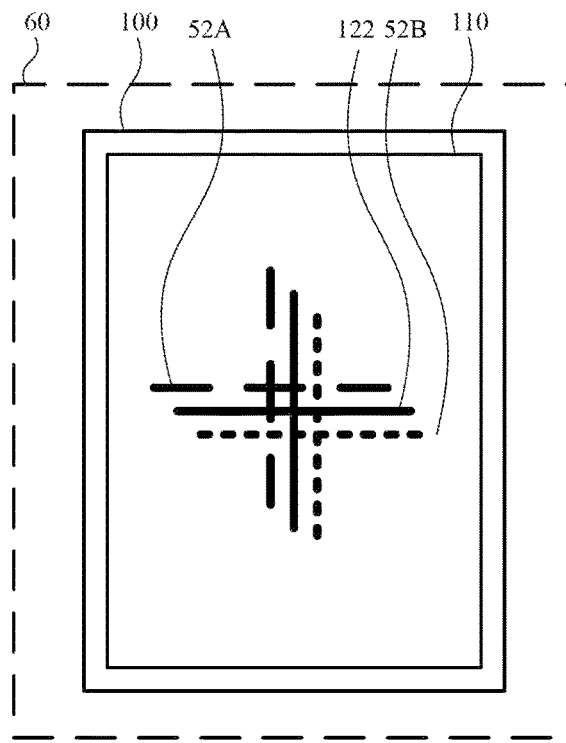
FIG. 8 illustrates the interface of FIG. 7 with display fiducials partially calibrated with respect to a calibration fiducial of the calibration device, according to some embodiments of the present disclosure.

As shown in FIG. 8, one or both of the display fiducials 52A and 52B can be rotationally adjusted to align with the calibration fiducial 122. While only one of the display fiducials 52A and 52B is illustrated as changing its orientation from FIG. 7 to FIG. 8, it will be understood that user input can be provided to adjust either or both of the display fiducials 52A and 52B.

Figure 9:
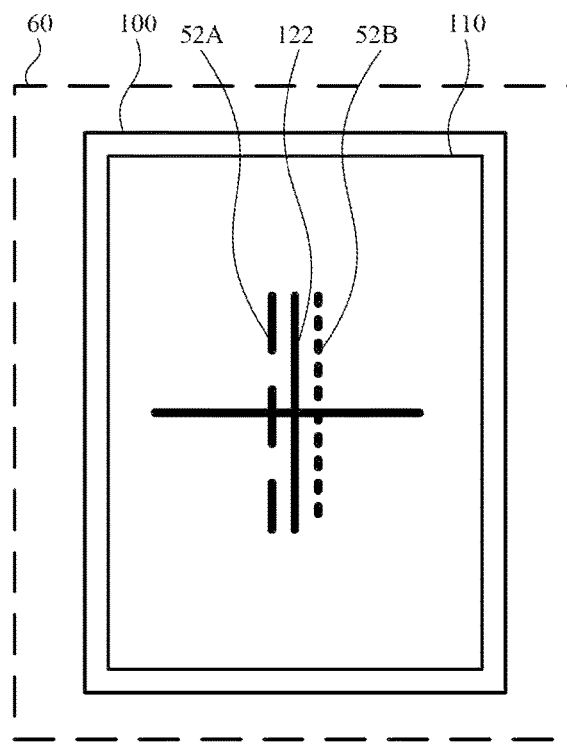
FIG. 9 illustrates the interface of FIGS. 7 and 8 with the display fiducials partially calibrated with respect to the calibration fiducial of the calibration device, according to some embodiments of the present disclosure.

As shown in FIG. 9, one or both of the display fiducials 52A and 52B can be positionally (e.g., translationally) adjusted to align with the calibration fiducial 122. For example, the display fiducials 52A and 52B are illustrated as changing their position along one axis from FIG. 8 to FIG. 9.

Figure 10:
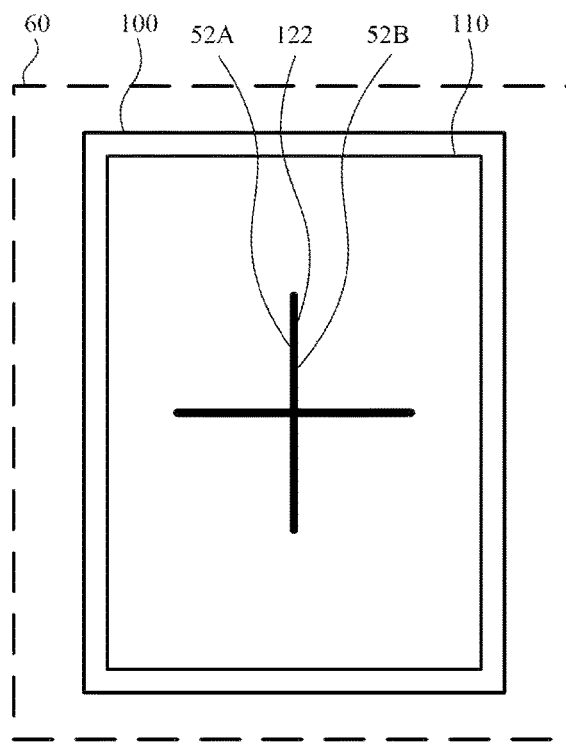
FIG. 10 illustrates the interface of FIGS. 7-9 with display fiducials calibrated with respect to the calibration fiducial of the calibration device, according to some embodiments of the present disclosure.

As shown in FIG. 10, one or both of the display fiducials 52A and 52B can be further positionally (e.g., translationally) adjusted to align with the calibration fiducial 122. For example, the display fiducials 52A and 52B are illustrated as changing their position along another axis from FIG. 9 to FIG. 10.

It will be understood that the adjustments illustrated in FIGS. 7-10 can be performed in any order. In some embodiments, a position and an orientation of a display fiducial can be adjusted simultaneously.

When the display fiducials 52A and 52B are aligned with the calibration fiducial 122, a user input can be provided (e.g., to the head-mountable device and/or the calibration device) to indicate that the fiducials are aligned. The alignment provided and/or confirmed by the user can be used as a recommended adjustment and/or calibration for further operations of the displays. Thereafter, the fiducials provided by the head-mountable device can be removed, and further operations of the displays can be performed based on the recommended adjustment and/or calibration. Such operations need not involve the calibration device 100.

Figure 11:
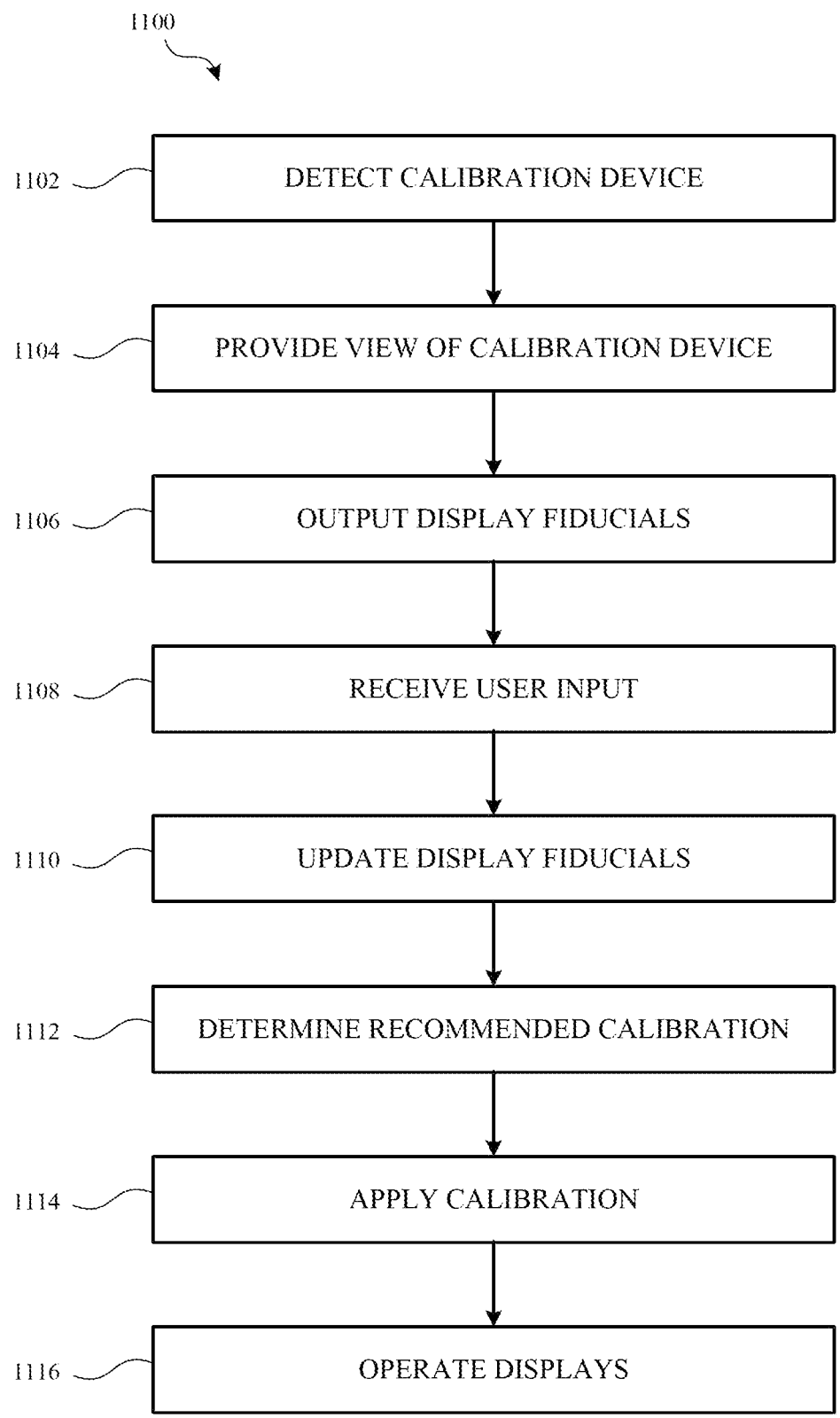
FIG. 11 illustrates a flow chart for a process having operations for calibrating a head-mountable device, according to some embodiments of the present disclosure.

FIG. 11 illustrates a flow diagram of an example process 1100 for calibrating a head-mountable device. For explanatory purposes, the process 1100 is primarily described herein with reference to the head-mountable device 10 and the calibration device 100. However, the process 1100 is not limited to the head-mountable device 10 and the calibration device 100, and one or more blocks (or operations) of the process 1100 may be performed by different components of the head-mountable device and/or one or more other devices. Further for explanatory purposes, the blocks of the process 1100 are described herein as occurring in serial, or linearly. However, multiple blocks of the process 1100 may occur in parallel. In addition, the blocks of the process 1100 need not be performed in the order shown and/or one or more blocks of the process 1100 need not be performed and/or can be replaced by other operations.

The process 1100 can begin when the head-mountable device detects a calibration device and/or when a calibration device detects a head-mountable device (1102). Such detections can be by one or more sensors of either or both devices and/or based on a communication link between the devices. The detections can include the determination of a relative position and/or orientation of the head-mountable device and the calibration device, as described herein.

The head-mountable device can provide a view of the calibration device through one or more displays thereof (1104). The view can include a calibration fiducial output by a display of the calibration device. Such a view can be provided through pass-through features of the displays and can include other objects in an external environment of the head-mountable device.

The head-mountable device can operate the displays to output display fiducials (1106). Each of the displays can be operated independently to provide its own display fiducial. Each of the display fiducials can have a position and orientation with respect to the calibration fiducial output by the display of the calibration device. Where the displays of the head-mountable device have been distorted, the display fiducials may not match are aligned with the calibration fiducial.

The head-mountable device can receive user input relating to the alignment of the display fiducials and the calibration fiducial (1108). The user input can include instructions to adjust the rotation and/or position of one or more of this display fiducials with respect to the calibration fiducial. The user input can be provided and/or received at an input device of the head-mountable device. Additionally or alternatively, the user input can be provided and/or received at an input device of the calibration device and communicated to the head-mountable device by network interfaces thereof.

The head-mountable device can update the display fiducials based on the user input (1110). For example, the position and/or orientation of any given display fiducial can be adjusted to implement the instructions provided by a user input. Such adjustments can be made and provided to the user so that the user has an opportunity to provide further user input for further adjustments, where applicable.

The head-mountable device can determine a recommended calibration based on the user input (1112). For example, the user input can include adjustments to the display fiducials and/or a confirmation and/or verification that the updated alignment of the display fiducials matches the position and/or orientation of the calibration fiducial.

The head-mountable device can apply a calibration to the displays thereof (1114). Based on the adjustments required to bring the display fiducials into alignment with the calibration fiducial, further operations of the display can be based on the same adjustments (1116). As such, the adjustments can be made even after the display fiducials are removed and/or the calibration device is no longer present.

Figure 12:
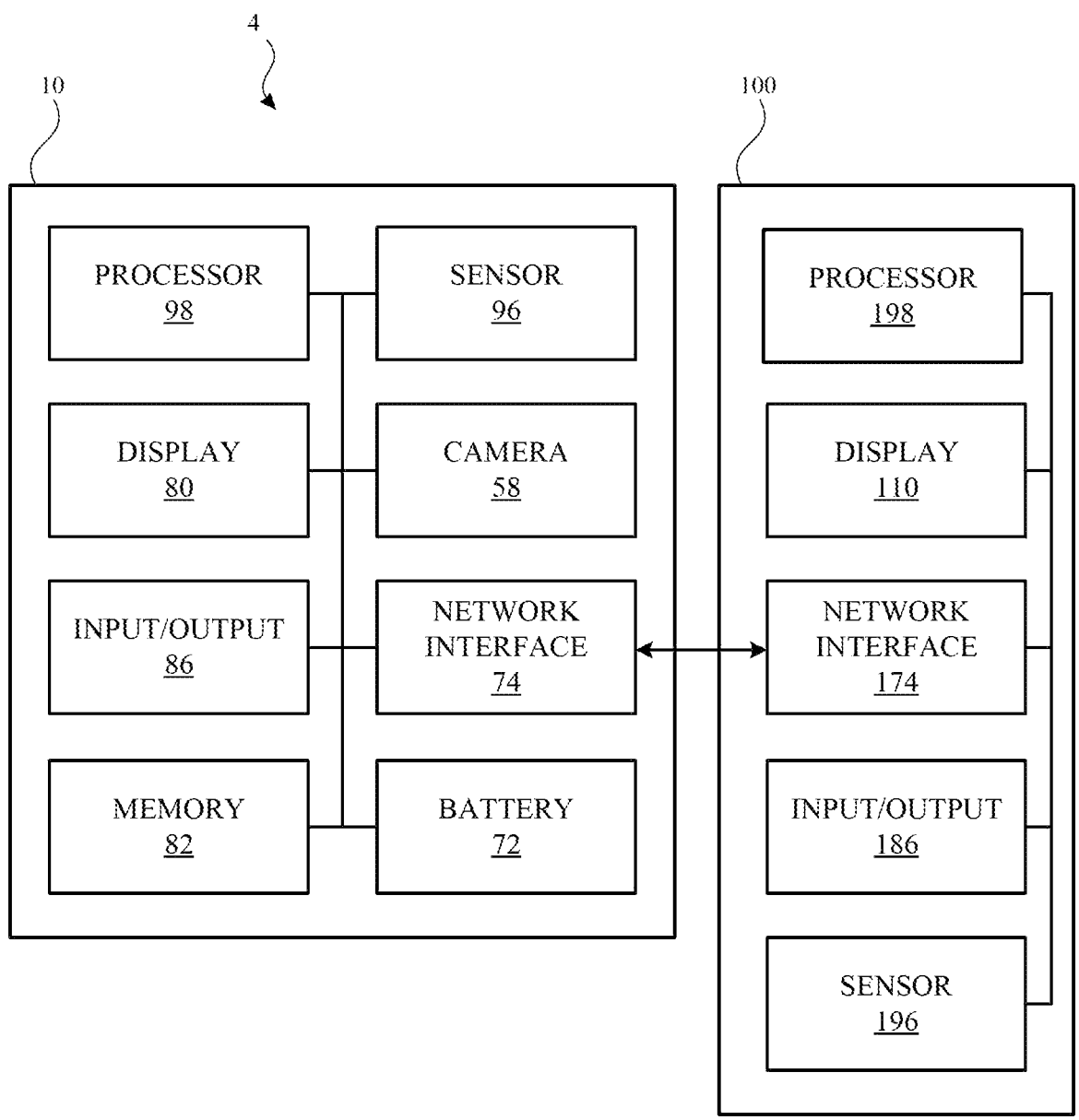
FIG. 12 illustrates a block diagram of a head-mountable device and a calibration device, in accordance with some embodiments of the present disclosure.

Referring now to FIG. 12, components of the head-mountable device and a calibration device can be operably connected to provide the performance described herein. FIG. 12 shows a simplified block diagram of an illustrative head-mountable device 10 and a calibration device 100 in accordance with one embodiment of the invention. It will be understood that additional components, different components, or fewer components than those illustrated may be utilized within the scope of the subject disclosure.

As shown in FIG. 12, the head-mountable device 10 can include a processor 98 (e.g., control circuitry) with one or more processing units that include or are configured to access a memory 82 having instructions stored thereon. The instructions or computer programs may be configured to perform one or more of the operations or functions described with respect to the head-mountable device 10. The processor 98 can be implemented as any electronic device capable of processing, receiving, or transmitting data or instructions. For example, the processor 98 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 82 can store electronic data that can be used by the head-mountable device 10. For example, the memory 82 can store electrical data or content such as, for example, audio and video files, documents and applications, device settings and user preferences, timing and control signals or data for the various modules, data structures or databases, and so on. The memory 82 can be configured as any type of memory. By way of example only, the memory 82 can be implemented as random access memory, read-only memory, Flash memory, removable memory, or other types of storage elements, or combinations of such devices.

The head-mountable device 10 can further include a display 50 for displaying visual information for a user, including display fiducials. The display 50 can provide visual (e.g., image or video) output. The display 50 can be or include an opaque, transparent, and/or translucent display. The display 50 may have a transparent or translucent medium through which light representative of images is directed to a user's eyes. The display 50 may utilize digital light projection, OLEDs, LEDS, uLEDs, liquid crystal on silicon, laser scanning light source, or any combination of these technologies. The medium may be an optical waveguide, a hologram medium, an optical combiner, an optical reflector, any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 10 can include an optical subassembly configured to help optically adjust and correctly project the image-based content being displayed by the display 50 for close up viewing. The optical subassembly can include one or more lenses, mirrors, or other optical devices.

The head-mountable device 10 can further include a sensor 96 (e.g., camera or other sensor) for capturing a view of an external environment, as described herein. The view captured by the sensor can be presented by the display 50 or otherwise analyzed to provide a basis for an output on the display 50.

The head-mountable device 10 can include an input/output component 86, which can include any suitable component for receiving input from a user and/or providing output to a user. The input/output component 86 can include buttons, keys, a touchscreen, keyboard, mouse, microphone, camera, and the like for operation by the user. Accordingly, the input/output component 86 can detect a user's touch, voice, speech, movement, gestures, and the like for detection as a user input that can form the basis for a recommended adjustment and/or calibration. The inputs can be detect onboard the head-mountable device 10 and/or at another device in communication with the head-mountable device 10. As such, the input can be received at an input device that is connected to other otherwise in operable communication (e.g., wireless or wired) with the head-mountable device 10 (e.g., via the network interface 74). The input/output component 86 can include speakers operably connected to the processor 98 for control of speaker output, including sound levels, as described further herein.

The head-mountable device 10 can include a battery 172, which can charge and/or power components of the head-mountable device 10. The battery can receive power from external devices connected to the head-mountable device 10, such as the case 300.

The head-mountable device 10 can include a network interface 74 for communicating with one or more servers or other devices, such as the case 300, using any suitable communications protocol. For example, a network interface 74 can support Wi-Fi (e.g., a 802.11 protocol), Ethernet, Bluetooth, high frequency systems (e.g., 900 MHZ, 2.4 GHZ, and 5.6 GHZ communication systems), infrared, TCP/IP (e.g., any of the protocols used in each of the TCP/IP layers), HTTP, BitTorrent, FTP, RTP, RTSP, SSH, any other communications protocol, or any combination thereof. A network interface 74 can also include an antenna for transmitting and receiving electromagnetic signals.

The calibration device 100 can include a processor 198 (e.g., control circuitry) with one or more processing units that include or are configured to access a memory having instructions stored thereon. The instructions or computer programs may be configured to perform one or more of the operations or functions described with respect to the calibration device 100. The processor 198 can be implemented as any electronic device capable of processing, receiving, or transmitting data or instructions. For example, the processor 198 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The calibration device 100 can further include a display 110 for displaying visual information for a user, including calibration fiducials.

The calibration device 100 can include an input/output component 186, which can include any suitable component for receiving input from a user and/or providing output to a user. The input/output component 186 can include buttons, keys, a touchscreen, keyboard, mouse, microphone, camera, and the like for operation by the user. The input/output component 86 can include speakers operably connected to the processor 198 for control of speaker output, including sound levels, as described further herein.

The calibration device 100 can further include a sensor 196 (e.g., camera or other sensor) for capturing a view of the head-mountable device 10, as described herein.

The calibration device 100 can include a network interface 174 for communicating with one or more servers or other devices, such as the case 300, using any suitable communications protocol. For example, a network interface 174 can support Wi-Fi (e.g., a 802.11 protocol), Ethernet, Bluetooth, high frequency systems (e.g., 900 MHZ, 2.4 GHZ, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. A network interface 174 can also include an antenna for transmitting and receiving electromagnetic signals.

Accordingly, embodiments the present of disclosure provide a head-mountable device with displays and/or cameras that can be calibrated for accurate recording and visual output. Whereas some aspects of a head-mountable device can be calibrated at the time of production, usage and wear of the head-mountable device can result in certain components becoming misaligned. The calibration device can provide an output that serves as a reference for each of a pair of displays of the head-mountable device. Each of the displays can be independently adjusted so their corresponding outputs are properly aligned with the view of the external environment Various examples of aspects of the disclosure are described below as clauses for convenience. These are provided as examples, and do not limit the subject technology.

Clause A: a head-mountable device comprising: a first display; a second display; a processor configured to: detect a calibration device outputting an image of a calibration fiducial; output, on the first display, a first display fiducial; output, on the second display, a second display fiducial; receive a user input; based on the user input, determine a recommended calibration; and operate the first display and the second display based on the recommended calibration.

Clause B: a head-mountable device comprising: a first display configured to output a first display fiducial within a first view of a calibration fiducial of a calibration device; a second display configured to output a second display fiducial within a second view of the calibration fiducial of the calibration device; and an input device configured to receive: a first user input, the first display being configured to update the first display fiducial based on the first user input; and a second user input, the second display being configured to update the second display fiducial based on the second user input.

Clause C: a method of calibrating a head-mountable device, the method comprising: detecting a calibration device outputting an image of a calibration fiducial; outputting, on a display, a display fiducial with respect to the calibration fiducial; receiving a user input; updating the display fiducial with respect to the calibration fiducial based on the user input; determining a recommended calibration based on the updated display fiducial; and operating the display based on the recommended calibration.

One or more of the above clauses can include one or more of the features described below. It is noted that any of the following clauses may be combined in any combination with each other, and placed into a respective independent clause, e.g., Clause A, B, or C.

Clause 1: each of the first display and the second display comprises: a waveguide configured to provide a view to the calibration device; and a projector for projecting light onto the waveguide.

Clause 2: a sensor, wherein the calibration device is detected with the sensor.

Clause 3: a network interface, wherein the calibration device is detected with the sensor.

Clause 4: an input device of the head-mountable device for detecting the user input.

Clause 5: the user input is received at an input device of the calibration device and transmitted from the calibration device to the head-mountable device.

Clause 6: the input device is further configured to receive: a third user input indicating that the position and orientation of the updated first display fiducial match a position and orientation of the calibration fiducial; and a fourth user input indicating that the position and orientation of the updated second display fiducial match the position and orientation of the calibration fiducial.

Clause 7: the input device is further configured to receive: the first display is further configured to output first information having a position and orientation that is based on the updated first display fiducial; and the second display is further configured to output second information based on the updated first display fiducial.

Clause 8: a sensor configured to detect a position and orientation of the calibration device with respect to the head-mountable device.

Clause 9: a network interface for receiving from the calibration device an indication of a position and orientation of the calibration device with respect to the head-mountable device, wherein the first display fiducial and the second display fiducial are output based on the indication.

Clause 10: each of the first display and the second display comprises: a waveguide configured to provide a view to the calibration device; and a projector for projecting light onto the waveguide.

Clause 11: updating the display fiducial comprises adjusting a position and orientation of the display fiducial with respect to the calibration fiducial.

Clause 12: the user input is a first user input; determining the recommended calibration is further based on a second user input indicating that the position and orientation of the display fiducial match a position and orientation of the calibration fiducial.

Clause 13: the user input is received by an input device of the head-mountable device.

Clause 14: the user input is received from the calibration device and via a network interface of the head-mountable device based on operation of an input device of the calibration device.

Clause 15: detecting the calibration device comprises operating a sensor of the head-mountable device.

Clause 16: detecting the calibration device comprises receiving from the calibration device and via a network interface of the head-mountable device an indication of a position and orientation of the calibration device with respect to the head-mountable device.

Clause 17: the display is a first display; the display fiducial is a first display fiducial; the user input is a first user input; the recommended calibration is a first recommended calibration; the further comprises: method outputting, on a second display, a second display fiducial with respect to the calibration fiducial; receiving a second user input; updating the second display fiducial with respect to the calibration fiducial based on the second user input; determining a second recommended calibration based on the updated second display fiducial; and operating the second display based on the second recommended calibration.

As described herein, aspects of the present technology can include the gathering and use of data. The present disclosure contemplates that in some instances, gathered data can include personal information or other data that uniquely identifies or can be used to locate or contact a specific person. The present disclosure contemplates that the entities responsible for the collection, analysis, disclosure, transfer, storage, or other use of such personal information or other data will comply with well-established privacy practices and/or privacy policies. The present disclosure also contemplates embodiments in which users can selectively block the use of or access to personal information or other data (e.g., managed to minimize risks of unintentional or unauthorized access or use).

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
    a first display comprising:
        a first waveguide configured to provide a first view to a calibration device; and
        a first projector for projecting light onto the first waveguide;
    a second display comprising:
        a second waveguide configured to provide a second view to the calibration device; and
        a second projector for projecting light onto the second waveguide;
    a sensor; and
    a processor configured to:
        detect the calibration device outputting an image of a calibration fiducial;
        determine, with the sensor, a position and orientation of the calibration device with respect to the head-mountable device;
        output, on the first display, a first display fiducial;
        output, on the second display, a second display fiducial;
        while outputting the first display fiducial and the second display fiducial, receive a user input;
        based on the user input, determine a recommended calibration; and
        operate the first display and the second display based on the recommended calibration.

2. The head-mountable device of claim 1, further comprising:
a frame supporting the first display and the second display; and
a pair of arms extending from the frame.

3. The head-mountable device of claim 1, wherein the sensor is an image sensor.

4. The head-mountable device of claim 1, further comprising a network interface, wherein the position and orientation of the calibration device is determined based on an indication received from the calibration device via the network interface.

5. The head-mountable device of claim 1, further comprising an input device of the head-mountable device for detecting the user input.

6. The head-mountable device of claim 1, wherein the user input is received at an input device of the calibration device and transmitted from the calibration device to the head-mountable device.

7. A head-mountable device comprising:
a first display comprising a first waveguide and a first projector for projecting light onto the first waveguide, the first display being configured to output a first display fiducial within a first view of a calibration fiducial of a calibration device;
a second display comprising a second waveguide and a second projector for projecting light onto the first waveguide, the second display being configured to output a second display fiducial within a second view of the calibration fiducial of the calibration device;
a sensor configured to detect a position and orientation of the calibration device with respect to the head-mountable device; and
an input device configured to receive:
a first user input while the first display fiducial is being output, the first display being configured to update the first display fiducial based on the first user input and the position and orientation of the calibration device with respect to the head-mountable device; and
a second user input while the second display fiducial is being output, the second display being configured to update the second display fiducial based on the second user input and the position and orientation of the calibration device with respect to the head-mountable device.

8. The head-mountable device of claim 7, wherein the input device is further configured to receive:
a third user input indicating that a position and orientation of the updated first display fiducial match a position and orientation of the calibration fiducial; and
a fourth user input indicating that a position and orientation of the updated second display fiducial match the position and orientation of the calibration fiducial.

9. The head-mountable device of claim 7, wherein:
the first display is further configured to output first information having a position and orientation that is based on the updated first display fiducial; and
the second display is further configured to output second information based on the updated first display fiducial.

10. The head-mountable device of claim 7, further comprising:
a frame supporting the first display and the second display; and
a pair of arms extending from the frame.

11. The head-mountable device of claim 7, wherein the sensor is an image sensor.

12. The head-mountable device of claim 7, further comprising a network interface for receiving from the calibration device an indication of the position and orientation of the calibration device with respect to the head-mountable device.

13. A method of calibrating a head-mountable device, the method comprising:
detecting, with a sensor of the head-mountable device, a calibration device outputting an image of a calibration fiducial;
outputting, on a display of the head-mountable device, a display fiducial with respect to the calibration fiducial;
while outputting the display fiducial, receiving a first user input;
updating the display fiducial by adjusting a position and orientation of the display fiducial with respect to the calibration fiducial;
after updating the display fiducial, receiving a second user input indicating that the position and orientation of the display fiducial match a position and orientation of the calibration fiducial;
determining a recommended calibration based on the updated display fiducial and the second user input; and
operating the display based on the recommended calibration.

14. The method of claim 13, wherein updating the display fiducial comprises adjusting a position and orientation of the display fiducial with respect to the calibration fiducial.

15. The method of claim 13, wherein the first user input and the second user input are received by an input device of the head-mountable device.

16. The method of claim 13, wherein the first user input and the second user input are received from the calibration device and via a network interface of the head-mountable device based on operation of an input device of the calibration device.

17. The method of claim 13, wherein the sensor is an image sensor.

18. The method of claim 17, further comprising capturing an image of the calibration device with the image sensor.

19. The method of claim 13, wherein detecting the calibration device further comprises receiving from the calibration device and via a network interface of the head-mountable device an indication of a position and orientation of the calibration device with respect to the head-mountable device.

20. The method of claim 13, wherein:
the display is a first display;
the display fiducial is a first display fiducial;
the recommended calibration is a first recommended calibration;
the method further comprises:
outputting, on a second display of the head-mountable device, a second display fiducial with respect to the calibration fiducial;
receiving a third user input;
updating the second display fiducial with respect to the calibration fiducial based on the third user input;
determining a second recommended calibration based on the updated second display fiducial; and
operating the second display based on the second recommended calibration.

* * * * *